May 7, 1940.   G. D. ROEDELS   2,200,123
ADMISSION TICKET CHECKING AND DISPENSING APPARATUS
Filed April 15, 1936
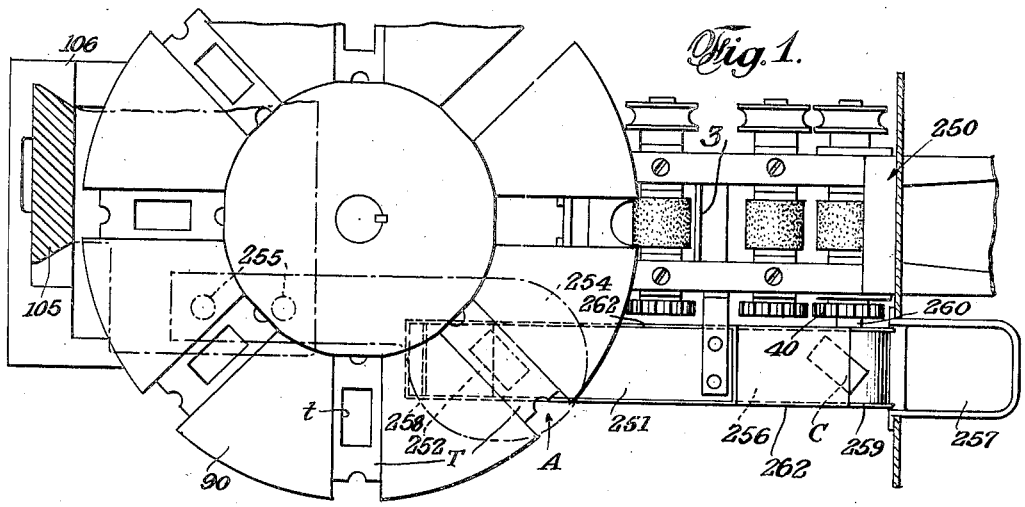
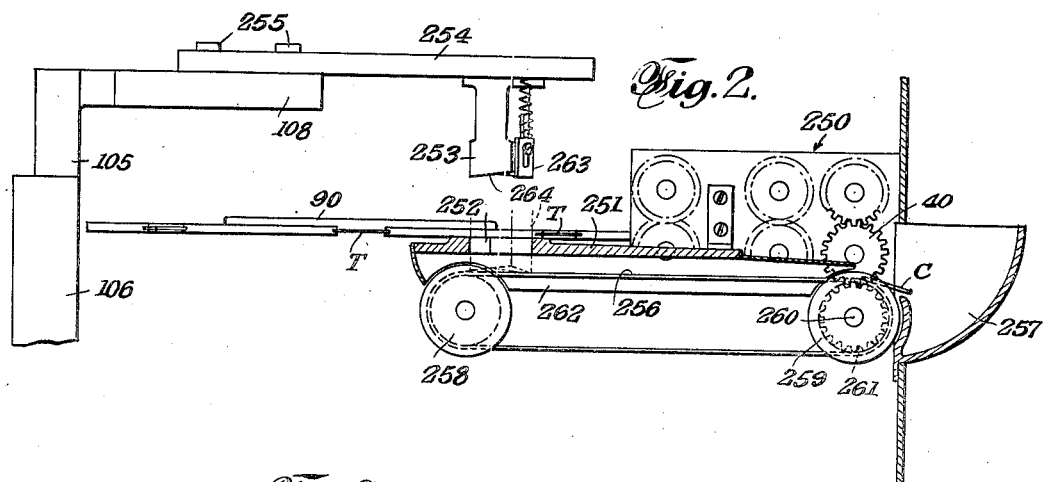
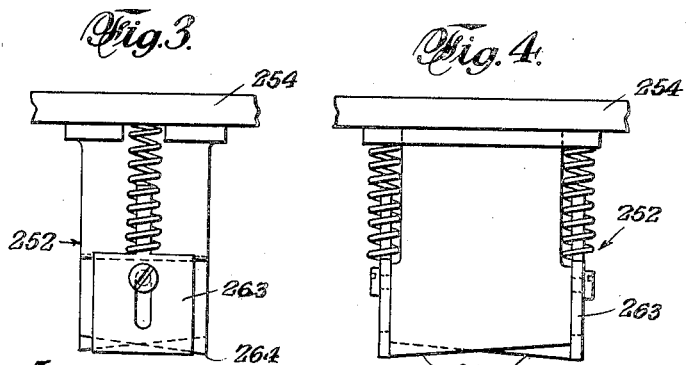
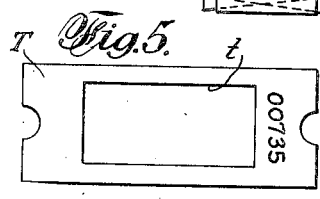
INVENTOR
George D. Roedels
BY
ATTORNEY Patented May 7, 1940

2,200,123

UNITED STATES PATENT OFFICE 2,200,123

ADMISSION TICKET CHECKING AND DISPENSING APPARATUS

George D. Roedels, New York, N. Y., assignor to Bell Punch Company, Ltd., London, England Application April 15, 1936, Serial No. 74,464

5 Claims. (Cl. 164—15)

This invention relates to strip ticket cancelling and checking machines and more particularly to a method and device for punching out a portion of a ticket to form a coupon to be given to and retained by the ticket purchaser. The present improvements are based on a machine as disclosed in my U. S. Patent No. 2,072,532, dated March 2, 1937.

As stated in my U. S. Patent No. 1,964,215, dated June 26, 1934, the practice was that a theatre patron after purchasing admission tickets, tendered them to a door man or ticket taker who severed each ticket in two, giving the patron one portion and depositing the other portion in a receptacle which was later emptied by the theatre management, the ticket portions being counted and comparisons made with the ticket seller's record, etc. In that patent, I sought to provide a new ticket checking system and disclosed a machine for issuing a coupon for each ticket inserted thereinto for cancelling. This, however, required the printing and furnishing of separate coupons which entailed additional expense, both for the coupons and for the extra mechanism or equipment for storing and dispensing them. It is to obviate these additional expenses that the present invention contemplates forming or piercing the coupon out of the material of the original admission ticket.

The present invention is for improvements on my said patent and for improvements on and additions to the device disclosed in my U. S. Patent No. 2,072,532.

The primary object of the present invention resides in the provision of simple means for receiving a ticket, punching out a portion of the ticket to form a coupon, storing for checking the remainder of the ticket, and issuing said coupon to the purchaser.

The more specific objects of the invention will become more apparent from the following specification which is based on the accompanying drawing forming part of this disclosure.

In the drawing:

Fig. 1 is a broken plan view of a cancelling machine in corporating contemplated coupon forming and issuing mechanism.

Fig. 2 is a side view thereof, partly in cross-section.

Fig. 3 is an end view of a punching die employed in this mechanism.

Fig. 4 is a side view thereof.

Figs. 5 and 6 respectively show a punched ticket and a coupon.

The present invention contemplates the employment of ticket feeding mechanism 250, a severing device 3 for cutting individual tickets from a strip, a ticket transfer wheel 90, and a vertical slide 105 movable in a guideway 106, the above mechanism being similar to that disclosed in my said Patent 2,072,532.

The ticket transfer wheel 90 in the present application is similar to and serves the same function as the ticket transfer wheel 90 described in my said Patent 2,072,532, and the relation between the feeding mechanism 250 and the ticket transfer wheel 90 is similar to the relation between the transfer wheel 90 and the feeding mechanism described in the same patent. The function of the slide 105 in the instant application is the same as the function of the slide 105 illustrated and described in said patent. In the present instance, however, I prefer to position the slide 105, at a point diametrally opposite the ticket feeding mechanism 250 to provide space for the coupon punching and issuing devices.

In carrying out the invention, it is preferred to provide a fixed shear plate 251 having a die opening 252, said opening being preferably positioned directly beneath the first station to which the ticket is moved upon indexing of the transfer wheel 90. This position is shown at (Figure 1A).

The slide 105, provided with an overstanding arm 108, has affixed thereto, a punch 253, carried by a plate 254 which is secured as by screws 255 to said slide in a manner whereby the punch may be accurately located in relation to the die opening 252.

It will be noted, from the above, that upon each reciprocation of the slide 105, the punch 253 will sever from the ticket T, a central portion C comprising a coupon. While the coupon may drop off the punch by gravity, in the present case, it is preferred to move the punch so, in effect, it deposits the coupon directly upon the belt 256 which, through its continuous movement, strips the coupon off the punch. This obviates clogging the device and insures a coupon delivery for each ticket introduced into the machine.

The punched ticket T will remain with the transfer wheel to be moved to subsequent stations for other cancelling and checking action and eventually to be stacked as disclosed in the mentioned application. The opening t formed in the ticket adapts said ticket for stacking in a chute or reservoir having central guide means.

The coupon C, however, is arranged to fall upon a belt or other conveyor means 256 to be conveyed thereby to a cup or like receptacle 257 from which it may be removed by the purchaser of the ticket, or the attendant who hands it to the patron.

As illustrated, it is preferred to train the belt 256 about the flanged pulleys 258 and 259, the latter being fixed to a shaft 260 upon which a spur gear 261 is mounted. This gear is arranged in driving relation with the gear 40 of the ticket feeding mechanism 250.

In order to insure against inadvertent dislodgement of the ticket from the belt, an apron-like portion 262 is arranged along each edge thereof so the upper run of the belt is completely surrounded, the flanges of the pulleys completing this safety guide means.

The die 252 may be of usual design, but it is preferred to provide strippers 263, to insure against inadvertent removal of the ticket T from the transfer wheel upon the upward stroke of said die. To insure a sharp punching operation the various edges of the punch are angled as at 264 to obtain a slicing or shearing cut.

From the foregoing it is apparent that simple mechanism has been disclosed for punching a coupon from a ticket and issuing said coupon. It is also apparent that this mechanism, while preferably incorporated with a cancelling machine such as disclosed in my pending application, may also be used by itself as a mechanism complete for the purpose. Further, the coupons may be provided with reading matter, as for instance advertising, etc., as shown at 265.

Changes in the mechanism within the skill of competent persons, may well be made without departing from the spirit and scope of the invention as claimed, hence the prior art rather than this specific disclosure should form the basis for the interpretation of said claims.

What I claim as new and desire to secure by Letters Patent, is:

1. In a cancelling machine for tickets, means for feeding a strip of tickets including an arbitrary number of tickets into the machine in a step by step manner, means for severing individual tickets from the strip, means for severing each ticket of said strip into two substantial portions, means for guiding one of said portions to a position exterior of the machine for presentation to a patron, and means for storing the other portion of each ticket.

2. In a cancelling machine for tickets, means for engaging and positively advancing a strip of tickets including an arbitrary number of tickets into the machine in the direction of the length of the strip after insertion of one end of said strip in said machine, means for severing individual tickets from the strip, means operating automatically following such insertion for severing in succession each ticket of said strip into two substantial portions, means for guiding one portion of each of the tickets of the strip after severing to a position exterior of the machine for presentation to a patron, and means for storing the other portion of each of the tickets of the strip.

3. In a cancelling machine for tickets, means for feeding a strip of tickets including an arbitrary number of tickets into the machine, means for severing individual tickets from said strip, means for severing each of said individual tickets into two substantial portions, means for guiding one of said portions to a position exterior of the machine for presentation to a patron, and means for storing the other portion of each ticket.

4. In a cancelling machine for tickets, means for feeding a strip of tickets including an arbitrary number of tickets into the machine, means for severing individual tickets from said strip, means for severing each of said individual tickets into two substantial portions, individual carrying devices for carrying the several individual tickets from the first severing means to the second severing means, means for guiding one of said portions to a position exterior of the machine for presentation to a patron, and means for storing the other portion of each ticket.

5. In a cancelling machine for tickets, means for engaging and positively advancing a strip of tickets including an arbitrary number of tickets into the machine in the direction of the length of the strip after insertion of one end of said strip in said machine, means for severing individual tickets from said strip, means for severing each of said individual tickets into two substantial portions, means for guiding one of said portions to a position exterior of the machine for presentation to a patron, and means for storing the other portion of each ticket.

GEORGE D. ROEDELS.